United States Patent
Fetish, Jr.

[15] 3,669,471
[45] June 13, 1972

[54] FLEXIBLE CONNECTING DEVICE

[72] Inventor: William H. Fetish, Jr., Saddle Brook, N.J.

[73] Assignee: Uniroyal, Inc., New York, N.Y.

[22] Filed: May 19, 1970

[21] Appl. No.: 38,788

[52] U.S. Cl..............................................285/49, 285/225
[51] Int. Cl.......................................................F16l 11/12
[58] Field of Search..................285/48, 49, 50, 53, 224, 225, 285/229, 200, 130

[56] References Cited

UNITED STATES PATENTS

| 3,207,539 | 9/1965 | Hackforth | 285/200 |
| 837,608 | 12/1906 | Chaplin | 285/130 |
| 2,419,750 | 4/1947 | Wiberg | 285/225 |

FOREIGN PATENTS OR APPLICATIONS

| 12,830 | 3/1855 | France | 285/225 |
| 82,719 | 10/1895 | Germany | 285/225 |

*Primary Examiner*—Dave W. Arola
*Attorney*—Henry Sternberg

[57] ABSTRACT

A flexible connector for isolating noise and vibration in a pipeline. The connector includes a casing having a pair of openings at opposite ends thereof which define an internal chamber. A pair of axially spaced tubular members extend into the internal chamber through the openings and are connected to corresponding portions of the pipeline. A diaphragm surrounds each of the tubular members for flexibly fastening and sealing each of the tubular members to the casing.

The foregoing abstract is not intended to be limiting as to the scope of the invention in any way.

11 Claims, 4 Drawing Figures

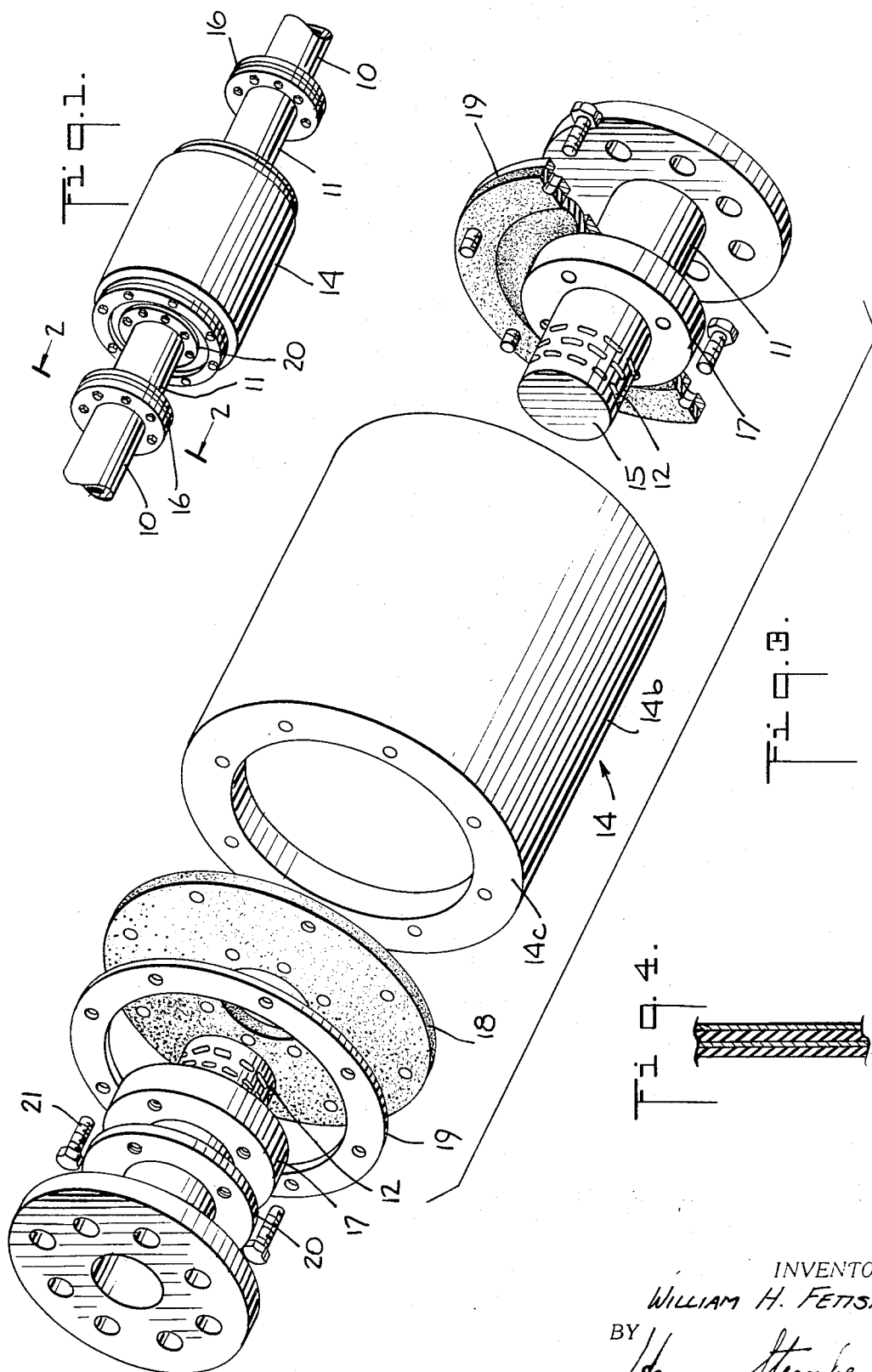

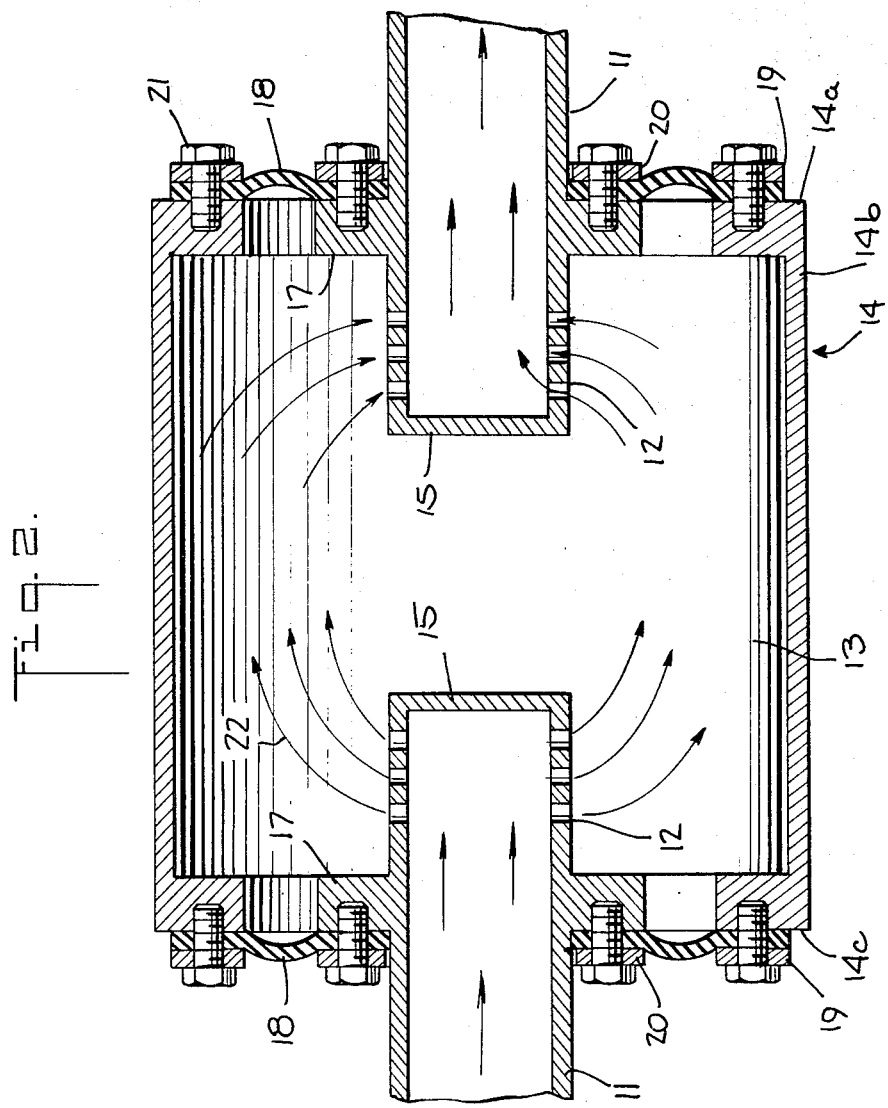

FLEXIBLE CONNECTING DEVICE

BACKGROUND OF THE INVENTION

The invention here presented relates to a device which flexibly connects a pair of spaced pipes and, more particularly, it relates to a device which isolates mechanical vibrations transmitted through the pipeline and impulses transmitted through the fluid medium, i.e., gas or liquid, being conveyed by the conduit system.

As is well known in the art to which the invention relates, pulsations and surges which this invention is designed to dampen and suppress originate in a number of ways. In general, pumps have an output flow which is usually characterized by a surge with each stroke of the pump followed by a recession to await the next stroke. This type of operation places undue strain upon the pipeline due to the excessively high pressures developed during surges and the abnormally low pressures developed in between surges. In addition to these periodic surges, shock waves may be generated in any system where the medium is subject to sudden deceleration, as for example, where a valve is closed against a moving medium. The closing of such a valve may result in the generation of high intensity shock waves, which may result in damage to the pipeline and in undesirable noises.

Heretofore, these surges and shock waves have been suppressed and damped by connecting a variety of devices in the pipeline, one of which includes a resilient sleeve of rubber or other suitable material, the resilient sleeve surrounds a pipe having peripherally spaced holes therein, and provides a variable volume. Sudden increases of pressure in the medium being conveyed by the pipeline causes the medium to flow through the peripherally spaced holes into the volume between the pipe and the sleeve, expanding the sleeve and thereby absorbing the excess pressure. When the pressure in the pipeline returns to normal, the sleeve contracts and the medium between the sleeve and the pipe is discharged back into the pipeline.

The connecting devices thus far developed, however, have been unable to operate at high temperatures and high pressures, and while they isolate and dampen the mechanical noise of the pipeline, they do not appreciably dampen the impulse noise transmitted by the medium being conveyed.

Accordingly, it is a primary object of the present invention to provide a connecting device which will overcome the aforesaid disadvantages.

A further object of this invention is to provide a connecting device, which may be used with a pair of misaligned spaced pipes.

A still further object is to provide an improved connecting device which will permit the spaced pipes a greater range of relative movement than was heretofore realizable.

Another object of this invention is to provide a connecting device which will allow greater freedom and flexibility in material selection than was previously possible, thereby permitting higher temperatures and higher pressure within a pipeline.

Still another object of this invention is to provide an improved, economical device for connecting a pair of spaced pipes.

Further objects and advantages of this invention will become apparent as the following description proceeds.

SUMMARY OF THE INVENTION

Briefly stated, and in accordance with one embodiment of this invention, there is provided a preferably tubular casing having a pair of openings at opposite axial ends thereof communicating with an internal chamber, a pair of conduit means extending into the internal chamber through the openings respectively, for connecting a pair of spaced conduits or pipes in a pipeline, and resilient members surrounding each of the conduit means for flexibly fastening and sealing each of the conduit means to the casing. The casing preferably includes a pair of annular end walls integral therewith. Both conduit means are preferably tubular members or pipes having peripherally spaced perforations in the cylindrical walls thereof, and imperforate end caps. The resilient members, being diaphragms, are preferably annular discs of elastomer coated fabric. The perforations of the tubular members and end caps are disposed within the internal chamber of the casing wherein the end caps are axially spaced from one another when the spaced conduits are in their closest spaced position. The resilient members permit relative axial, radial, and angular movement and/or misalignment between the inlet and outlet tubular members.

An impulse or surge of the medium being transmitted enters the inlet tubular member and is redirected by the end caps of the tubular member, thereby directing the resultant surge force, in lesser magnitude, in a multitude of different directions. The medium thereupon exists from the inlet tubular member, via the perforations in the cylindrical wall of the tubular member, into the internal chamber where the aforementioned surge or impulse is further reduced. Thereupon the medium reenters the pipeline through the perforations in the outlet tubular member as a uniform flow.

BRIEF DESCRIPTION OF THE DRAWINGS

While the specification concludes with claims particularly pointing out and distinctly claiming the subject matter of this invention, it is believed that the invention will be better understood from the following description, taken in conjunction with the accompanying drawings, in which:

FIG. 1 is a perspective view of the preferred embodiment of this invention shown connecting a pair of spaced conduits;

FIG. 2 is an enlarged sectional elevational view taken in the direction of arrows 2—2 of FIG. 1;

FIG. 3 is an enlarged exploded perspective view of the connecting device shown in FIG. 1; and FIG. 4 is a fragmentary enlarged sectional view of the resilient member shown in FIG. 3.

DESCRIPTION OF THE PREFERRED EMBODIMENT

Referring now to the drawings in greater detail, the present invention, as shown in FIG. 1, is disclosed as designed for use in a conduit system or pipeline connecting two spaced conduit portions or pipes 10. In FIG. 2, the conduit means or tubular members 11 are shown forming a portion of the pipeline and having a cross-sectional area substantially equal to that of pipes 10. Tubular members 11 are provided with peripherally spaced perforations 12 in their cylindrical walls. These perforations provide communication between the interior and exterior of the tubular members and are disposed within the internal chamber 13 of casing 14. The free ends of tubular members 11, disposed within the internal chamber 13, are plugged by imperforate end caps 15 integral with the aforementioned tubular members. In addition, tubular members 11 have integral therewith flanges 16. Flanges 16 are furnished with bolt holes intermediate their inner and outer peripheries extending completely therethrough and adapted to receive suitable clamping bolts for securing this joint to the flanged ends of the pipes 10. Similarly, tubular members 11 have integral therewith flanges 17. Flanges 17 are furnished with threaded holes intermediate their inner and outer peripheries. Casing 14 comprises a tubular shell 14b having a substantially larger interior diameter than the exterior diameter of tubular members 11, and a pair of end walls 14a and 14c integral therewith, defining the internal chamber 13. End walls 14a and 14c are annular plates having interior diameters substantially larger than the exterior diameters of the flanges 17 of tubular members 11. End walls 14a and 14c are provided with threaded holes intermediate their inner and outer peripheries. Resilient members or diaphragms 18 are annular discs having circumferentially spaced bolt holes intermediate their inner and outer peripheries extending completely therethrough so as to permit cap screws 21 to pass therethrough for threadedly engaging the threaded holes in flanges 17 of tubular member 11, and the threaded holes in end walls 14a and 14c. The interior diameters of the diaphragms are preferably slightly larger than the exterior diameters of the tubular members so that the latter may be received therein, and their exterior diameters are slightly smaller than the exterior diameter of tubular shell 14b. As shown in FIG. 3, clamping rings 19, having bolt holes intermediate their inner and outer peripheries extending completely therethrough, and in registry with the threaded openings in walls 14a and 14c cooperate with cap screws 21 to secure diaphragms 18 to their corresponding end walls 14a and 14c. Clamping rings 19 have substantially larger interior diameters than the exterior diameter of flanges 17 and have exterior diameters substantially equal to the exterior diameters of end walls 14a and 14c. Similarly, clamping rings 20, having bolt holes intermediate their inner and outer peripheries extending completely therethrough, and in registry with the threaded openings in flanges 17 cooperate with cap screws 21 to secure diaphragms 18 to one of the corresponding flanges 17 of tubular members 11. Clamping rings 20 have slightly larger interior diameters than tubular members 11 and have exterior diameters slightly smaller than the exterior diameter of flanges 17 of tubular members 11. The aforementioned casing and tubular members are made from a rigid material, such as a metal. The clamping rings 19 and 20, respectively, act, under the influence of cap screws 21 to securely fasten and seal the respective diaphragm 18 to the respective one of the flanges 17, on the one hand, and to the respective one of the wall portions 14a and 14c on the other hand, so as to provide a chamber from which the fluid medium cannot escape other than through the outlet conduit.

A typical diaphragm 18, as shown in FIGS. 3 and 4, is preferably fabricated by calendering an elastomer composition onto a fabric, and thereafter plying up sufficient layers of such calender coated fabric. The diaphragm contains one or more plies of such elastomer coated fabric depending on the pressures that the diaphragm must withstand and, of course, the material employed in the fabric layer.

An example of a preferred elastomer composition employed with a 16 ounce duck fabric would be as follows:

| Ingredient | Parts by Weight |
| --- | --- |
| Butadiene Acrylonitrile Copolymer | 100 |
| Zinc Oxide | 3 |
| Semireinforcing Black | 68 |
| Plasticizer | 16 |
| Antioxidant BLE (reaction product of diphenylamine and acetone) | 0.7 |
| Phthalic Anhydride | 0.4 |
| Tetra Methyl Thiuram Disulfide | 1.7 |
| N-Cyclohexyl-2 Benzothiazole Sulfenamide | 2.5 |
| Sulfur | 0.4 |

An example of a preferred cotton duck fabric employed with the aforementioned elastomer composition is as follows:

| | |
| --- | --- |
| Weight | 14.4 ounces per square yard |
| Ends per inch | 23 |
| Picks per inch | 23 |
| Yarn ply | 4×4 |
| Weave | plain (loop selvage) |

The required number of rubber coated plies are assembled and cured in a press, resulting in a diaphragm having a plurality of elastomer coated plies.

In assembling the aforementioned device, any convenient process may be employed, for example; the diaphragms 18 may first be secured to end walls 14a and 14c by means of clamping rings 19, then tubular members 11 may be secured to the diaphragms by means of clamping rings 20, and the assembled unit slid or placed within the aforementioned section of pipe 10 and secured thereto by a plurality of bolts passing through the bolt holes of flange 16 hereinbefore described.

In operation the device connects a pair of spaced portions of a pipeline having surges and pulsations of pressure therein. As shown in FIG. 2, the general direction of flow of the medium is indicated by arrows 22. The medium enters the inlet tubular member, wherein its direction of flow is redirected by the end caps through the perforations in the cylindrical wall of the inlet tubular member, thereby producing a multitude of lesser magnitude surge forces in different directions resulting in a net decrease in any one direction. The medium, thereupon flows into the internal, i.e., expansion chamber where the surge or impulse is further dissipated. Thereafter the medium flows uniformly back into the pipeline through the perforations in the outlet tubular member. The connecting device is so constructed that it compensates for relative movement of the spaced portions of the pipeline during operation. As the spaced portions contract, the tubular members move away from each other. The tubular members move toward each other in order to compensate for the expansion of the pipeline. However, the end caps of the tubular members preferably are spaced from one another when the spaced pipe portions of the pipeline are in their closest spaced axial position.

It is clear from the foregoing description, therefore that the herein described connecting device achieves the objectives of the present invention. The pair of tubular members cooperating with the aforementioned internal chamber smooth out surges and provide a uniformly continuous flow of the medium, thereby damping the impulse noise of the medium being transferred. Furthermore, the diaphragms permit this connecting device to be used in situations where the pipes to be connected are misaligned. Inasmuch as the end caps of the tubular members are axially spaced at all times, and as they are mounted on diaphragms, the connected pipes may undergo a greater amount of movement due for example to expansion and contraction, than was heretofore realizable. The diaphragm connection also permits relative movement of the connected conduit portions toward and away from each other as well as angularly resulting from the aforementioned surges in the fluid medium, as well as substantially preventing the transmission of mechanical vibrations from one of the conduit portions to the other. In addition, this invention permits materials to be selected which are appropriate to the range of operating temperatures and pressures within the pipeline. This invention substantially reduces manufacturing costs and may be readily used maintenance free over extended periods of time.

While a particular embodiment of this invention has been shown and described, it will be obvious to those skilled in the art that various changes and modifications may be made without departing from this invention in its broader aspects, and it is, therefore, intended in the appended claims to cover all such changes and modifications as fall within the true spirit and scope of this invention.

Having thus described my invention, what I claim and desire to protect by Letters Patent is:

1. A conduit connecting device comprising:
   a casing having a pair of opposite end walls and an intermediate shell portion defining with said end walls an internal chamber;
   an inlet conduit means extending through one of said end walls into the interior of said internal chamber;
   an outlet conduit means extending through the other of said end walls into the interior of said internal chamber;
   each said conduit means connected to its respective end wall and
   at least one of said end walls including a first resilient member connected to and surrounding the corresponding one of said conduit means flexibly fastening said one conduit means to the remainder of said casing, so as to permit relative movement between said inlet and outlet conduit means; and said inlet conduit means including a tubular portion located in said chamber and in spaced relationship with said shell portion and said outlet conduit means, said tubular portion having a plurality of perforations in the sidewall thereof and including an imperforate end cap.

2. A device as recited in claim 1, wherein the other of said end walls comprises a second resilient member surrounding the other of said conduit means, for flexibly fastening said other conduit means to the remainder of said casing.

3. A device as recited in claim 2, in which each of said resilient members comprises a substantially flat annular sheet of elastomer coated fabric.

4. A device as recited in claim 3, in which said annular sheet comprises a plurality of plies of elastomer coated fabric.

5. A device as recited in claim 2, in which said outlet conduit means comprises a tubular portion located in said chamber and having a plurality of perforations and an imperforate end cap, said last mentioned tubular portion extending into said chamber in a spaced relationship with said shell portion and axially spaced from said first mentioned imperforate end cap.

6. A device as recited in claim 5, in which said axial spacing within said chamber between said first and second mentioned imperforate end caps is such, with respect to the amount of movement permitted by said first resilient member, that said first and second mentioned imperforate end caps are spaced from one another when said inlet and outlet conduit means are in their closest position.

7. A device as recited in claim 5, in which said inlet and outlet means communicate with said internal chamber through said perforations in said tubular portions, respectively.

8. A device as recited in claim 7, in which said inlet and outlet means, respectively, have said plurality of perforations distributed peripherally about the cylindrical walls of said first and second mentioned tubular portions at the interior of said internal chamber.

9. A device as recited in claim 8, which further comprise:
means for connecting said tubular portions to said resilient members; and
means for connecting said tubular portions to a pair of spaced conduits.

10. A device as recited in claim 1, in which said intermediate shell portion is tubular; and said end walls include a pair of annular portions integral with said tubular shell.

11. A device as recited in claim 1, in which said casing and said inlet and outlet conduit means all comprise a rigid material.

* * * * *

PO-1050
(5/69)

UNITED STATES PATENT OFFICE
CERTIFICATE OF CORRECTION

Patent No. 3,669,471        Dated  June 13, 1972

Inventor(s)  WILLIAM H. FETISH, JR.

It is certified that error appears in the above-identified patent and that said Letters Patent are hereby corrected as shown below:

Column 6, line 12, delete "claim 8" and insert therefor -- claim 7 -- .

Signed and sealed this 23rd day of April 1974.

(SEAL)
Attest:

EDWARD M.FLETCHER,JR.
Attesting Officer

C. MARSHALL DANN
Commissioner of Patents